United States Patent
Kanada et al.

[11] Patent Number: 5,793,802
[45] Date of Patent: Aug. 11, 1998

[54] SYSTEM INCLUDING MOBILE RADIO STATION AND BASE RADIO STATION

[75] Inventors: Yoshihisa Kanada, Yokohama; Hiroshi Ishikawa, Shizuoka, both of Japan

[73] Assignee: International Business Machines Corporation, Armonk, N.Y.

[21] Appl. No.: 572,262

[22] Filed: Dec. 13, 1995

[30] Foreign Application Priority Data

Jan. 24, 1995 [JP] Japan ................................ 7-008727

[51] Int. Cl.$^6$ ................................................ H04B 1/38
[52] U.S. Cl. ........................... 375/220; 375/231; 375/232; 364/724.2
[58] Field of Search .................... 375/231, 232, 375/229, 220, 350; 364/724.19, 724.2

[56] References Cited

U.S. PATENT DOCUMENTS

| | | | |
|---|---|---|---|
| 3,978,407 | 8/1976 | Forney, Jr. et al. | 375/231 |
| 5,212,803 | 5/1993 | Uddenfeldt et al. | 455/33.1 |
| 5,231,648 | 7/1993 | Driedger et al. | 375/231 |
| 5,450,442 | 9/1995 | Umemoto et al. | 375/230 |

FOREIGN PATENT DOCUMENTS

| | | | |
|---|---|---|---|
| 0593186 | 12/1992 | European Pat. Off. | H04B 7/005 |
| 63-279623 | 11/1988 | Japan. | |
| 193275 | 1/1989 | Japan. | |
| 394525 | 4/1991 | Japan. | |
| 4207636 | 7/1992 | Japan. | |
| 5235792 | 9/1993 | Japan. | |

*Primary Examiner*—Don N. Vo
*Attorney, Agent, or Firm*—John D. Flynn

[57] ABSTRACT

A mobile radio station for communicating with a beta system can be constructed without providing means for calculating optimum tap gains, the size of a device can be reduced, and power consumption can be saved. A mobile station which tries to start communication sends a communication slot assignment request to a base station at a transmission speed which is so low that a transversal filter is not needed. The base station assigns this mobile station a communication slot and sends information on this communication slot assignment to the mobile station at the transmission speed which is so low that a transversal filter is not needed. The mobile station sends a training sequence to the base station with the assigned communication slot at a high speed. The base station calculates optimum tap gains of the transversal filter from the training sequence held therein and a signal actually received by the an adaptive equalizing mechanism. The base station sends the optimum tap gains to the mobile station at the transmission speed which is so low that the transversal filter is not needed. The mobile station sets to the transversal filter the tap gains sent from the base station and connects the transversal filter. In this way, high-speed communication is started between the base station and the mobile station.

45 Claims, 4 Drawing Sheets

SYSTEM INCLUDING MOBILE RADIO STATION AND BASE RADIO STATION

DETAILED DESCRIPTION OF THE INVENTION

1. Field of the Invention

The present invention relates to radio communication, and more particularly to a method of reducing the load of a mobile radio station that is used in a high-speed radio communication system using a TDMA-TDD (Time Division Multiple Access-Time Division Duplexing) method.

2. Background of the Invention

Figure 4:
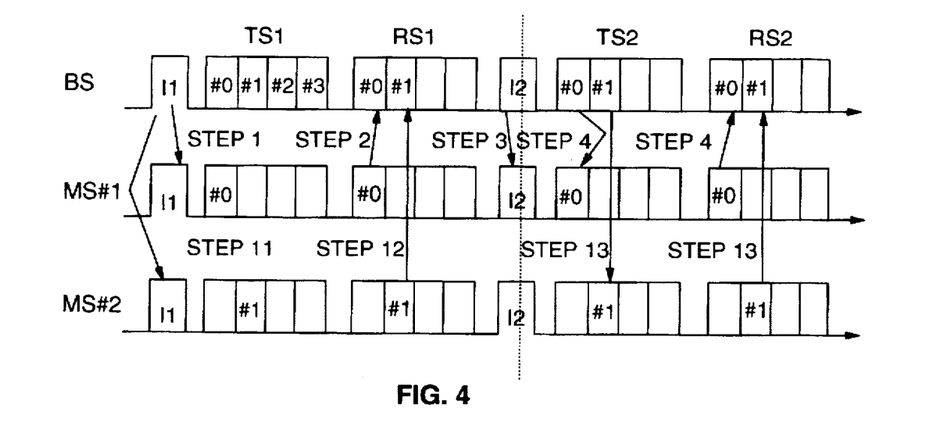
FIG. 4 is a diagram showing a flow of communication for explaining TDMA-TDD.

First, the TDMA-TDD method will be described. This method deals with radio (or wireless) communication (transmission and reception) which is performed between a plurality of stations by making use of one carrier frequency with time division. An example of this method is shown in FIG. 4. A base radio station BS uses a carrier frequency by time-dividing it into an information slot I, a transmitting slot sequence TS in the base station, and a receiving slot sequence RS in the base station. This information slot I is used to inform a mobile radio station of the start timing of the transmitting slot sequence TS and the receiving slot sequence RS, the assignment status of slots, and the like.

Also, the transmitting slot sequence TS is a slot sequence for the base station to transmit a signal to the mobile station, and the receiving slot sequence RS is a slot sequence for the base station to receive the signal from the mobile stations. The number of slots in these slot sequences may be any number, but in FIG. 4 four slots are shown for each slot sequence. By the repeat of a cycle including these information slot I, transmitting slot sequence TS, and receiving slot sequence RS, communication is performed between the base station and the mobile station.

Now, a case where a mobile radio station MS#1 wants to start communication with the base radio station BS is described.

First, the mobile radio station MS#1, receives an information slot I1 the base station BS transmitted (step 1) and finds empty communication slots. Since in this example a slot #0 is an empty slot, the mobile station MS#1 requests an assignment of communication slot from the base station by the slot #0 in the receiving slot sequence RS (step 2). Even if the mobile station MS#1 had data to be sent and there were an empty slot, the data to be sent would not be sent at once. This is because all mobile stations that can receive the information slot I1 know that the slot #0 is an empty slot and therefore there are some cases where a plurality of mobile radio stations send a slot assignment request with the same slot. If the base station BS receives the communication slot assignment request the mobile station MS#1 transmitted, the acceptance will be indicated by an information slot I2 (step 3). If not received, the slot assignment will not be indicated in the information slot I2, so the mobile radio station MS#1 will find an empty slot of the information slot I2 and make a similar assignment request.

When the communication slot has been assigned, the mobile radio station MS#1 starts sending data to be sent or receiving data to be received, with the assigned slot (in this example, communication slot #0) (step 4). The communication ends with the end of each communication slot, and a slot assignment request may be performed again if necessary. Communication may end only when a request to cut off an assigned slot is issued explicitly.

Further, a case where the base radio station BS wants to start communication with a mobile radio station MS#2 will be described.

In this case the base station BS can indicate that a communication slot #1 is assigned to the mobile radio station MS#2, with the information slot I1 (step 11). A slot number may be any number). If the mobile radio station MS#2 is in a state where it can receive data, it will send an identification signal with the assigned communication slot in the base station (step 12). If this identification does not return back, the mobile radio station MS#2 is to be moved outside the range of the base radio station BS in charge. If the base radio station BS receives the identification signal, it will again indicate that the communication slot #1 is assigned to the mobile radio station MS#2, with the information slot I2, and perform data communication with the mobile radio station MS#2 through the communication slot #1 (step 13).

An example of the data communication of the TDMA-TDD method will be performed as described above, but this can be changed in various ways. For example, a slot sequence only for access requests from mobile radio stations may be provided, or when a base radio station transmits data to a mobile radio station, it may transmit the data without receiving the identification signal from the mobile radio station, depending upon the status of the mobile radio station. Also, while it has been described that for transmission and reception, the slot is assigned with the same slot number in the same way, different slot numbers may be assigned for transmission and reception, or each slot of the transmitting slot sequence and the receiving slot sequence may individually be assigned.

The number of these mobile and base stations may be any number and the communication method between the base stations may be any method. Also, although in this method the communication with a plurality of mobile radio stations is performed by time-dividing transmission and reception at the one carrier frequency, there may be provided a base radio station such that a series of operations such as the foregoing are carried out with carriers of different frequencies. In addition, frequencies used for the communication may be different between the mobile stations. In this case, it is possible that frequencies are different between one for a calling (the information slot from the base station) and one for the communication of data.

Figure 5:
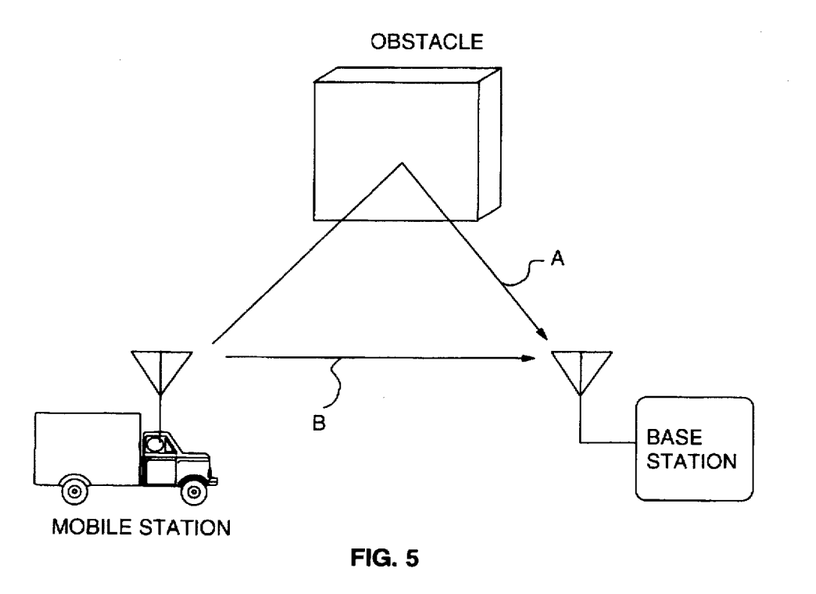
FIG. 5 is a diagram used to explain the distortion by multipath propagation.

Now, the data (signal) that the base radio station and the mobile radio station send is described. Generally, in radio communication the signal from the mobile station (or base station) is reflected by an obstacle and therefore there occurs a reflected signal "a" and a direct signal "b", as shown in FIG. 5. There are normally many of such obstacles, so there are many reflection paths and distortions occur in the signal received at the base station; multipath propagation. The distortions by the multipath propagation do not become an important problem when the transmission speed is slow. However, if the transmission speed becomes faster, there will occur an intersymbol interference where a previous symbol influences a current symbol. Since this intersymbol interference increases the bit error rate, it is a factor which prevented increasing the transmission speed.

Figure 7:
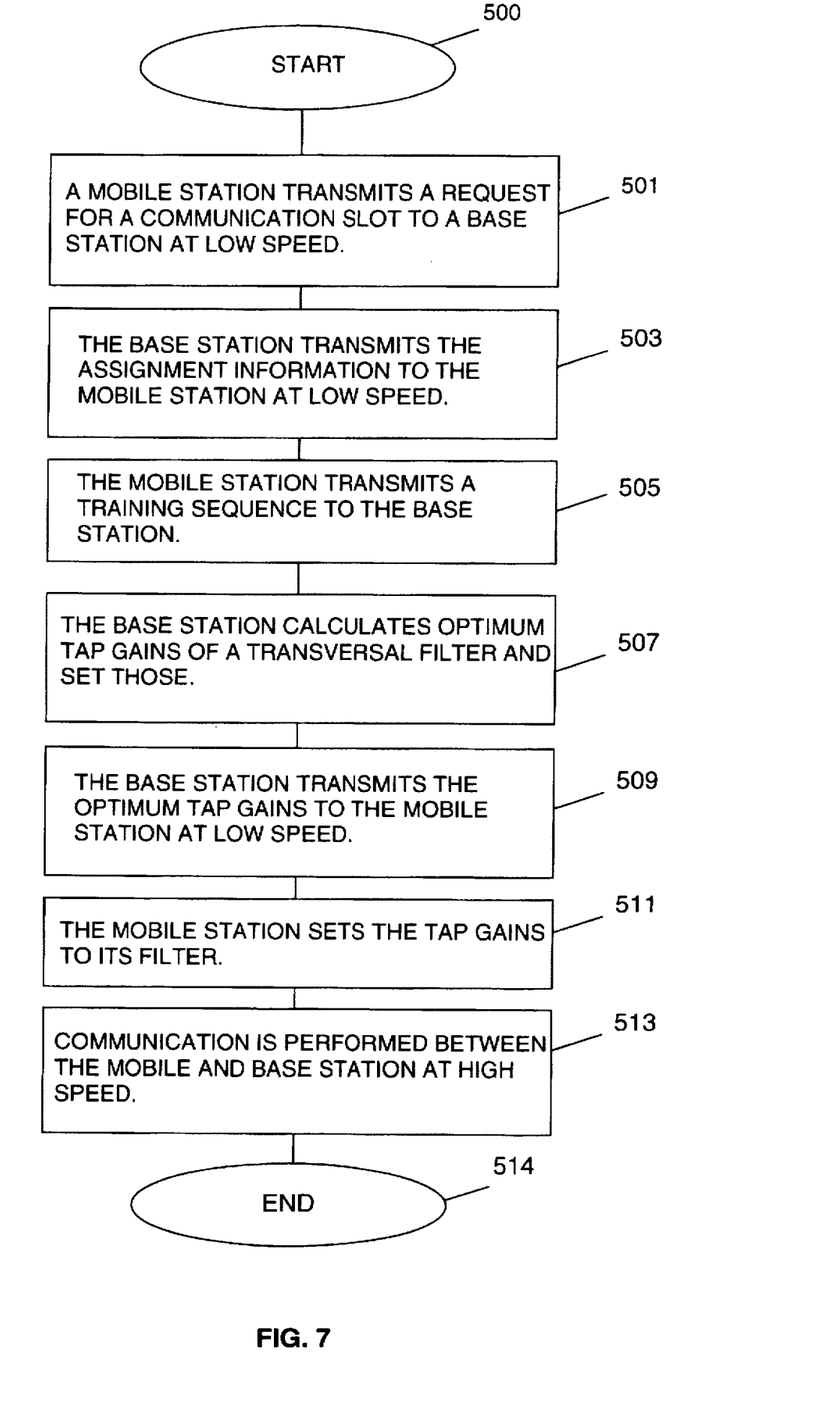
FIG. 7 is a flow chart diagram illustrating the steps used in the method of the present invention.

Then, an adaptive equalizing method was devised as a technique of compensating the signal distortion caused by the intersymbol interference. This method corrects the signal distortion at the receiver side and uses a tapped delay-line filter such as that shown in FIG. 7, for example. This tapped delay-line filter (also called a traversal filter) comprises a tapped delay circuit 10 which receives an input signal demodulated at a previous stage and includes a plurality of delay circuits 1, a plurality of variable-gain amplifiers 3A–3E for multiplying each output of the delay circuit 10 by a coefficient (tap gains), and an adder 5 for adding the outputs of the variable-gain amplifiers 3A–3E. By optimizing the coefficient of each variable-gain amplifier 3A–3E of this tapped delay-line filter, there can be obtained meaningful data. The calculation method of these coefficients will not be described because it does not relate directly to the present invention.

However, in order to set the above-described coefficients, a practice must be done at least once. That is, the data the receiver side already knows is sent by the transmitter side, and the coefficients obtained by comparison with the already known data must be set to the variable-gain amplifiers 3A–3E. Therefore, when the radio propagation conditions are changed each time data is transmitted (for example, when a mobile radio station moves), the above-described coefficients must be calculated each time data is transmitted. Therefore, even in a case where a base station sends data or a mobile station sends data, it is necessary that known data (hereinafter referred to as a training sequence) be first sent and desired data be then sent (FIG. 8 of Japanese Published Unexamined Patent Application No. 5-235792, for example).

Also, means for calculating the coefficient of the variable-gain amplifiers 3A–3E of the tapped delay-line filter has to be used in both the base station and the mobile station.

Such a limitation results mainly from the fact that the mobile station communicates while it is moving. However, the moving mobile station is not always in such a situation. For example, it has been desired that a high-speed wireless LAN be installed in offices, but normally a terminal equipment, corresponding to a mobile station, is not frequently moved. However, in the office, the characteristic of radio propagation changes because people who are the obstacles move. Then, the tap gains must be updated each time a person moves, but it is not so. This is because if the data transmission speed becomes faster, the variation in the radio propagation characteristic (the moving speed of a person is not fast) will relatively become slower, so communication becomes possible in one communication slot without updating the tap gains and consequently communication can be done in a plurality of slots. Also, it is obvious that the training sequence does not need to be sent each time data is sent. The base station and the mobile station are the same in radio propagation characteristic when the positions of antennas for transmission and reception are the same and the carrier frequencies are the same, so the calculation of the tap gains is not needed in both of the base station and the mobile station.

OBJECTS OF THE INVENTION

Accordingly, an object of the present invention is to reduce necessary resources in a mobile station to reduce the size of the mobile station.

Also, another object of the present invention is to reduce the size of the mobile station and save power consumption, by eliminating an adaptive equalizing mechanism on the mobile station side.

SUMMARY OF THE INVENTION

To achieve the above objects, a mobile radio station for communicating with a base station using radio signals is provided. The mobile radio station has a receiving means for receiving signals from the base station at a first data rate and at a second data rate. The second data rate is higher than said first data rate. The mobile radio station also has a means for transmitting signals to the base station, an adaptive filter, connected to the receiving means, for performing signal compensation for signals received from the base station at the second data rate, and a control means, in a first mode for setting signal compensation parameters in the adaptive filter in response to receiving a signal with the parameters transmitted from the base station at the first data rate, and in a second mode for allowing the mobile radio station to process signals received from the base station at the second data rate which are compensated by the adaptive filter in accordance with the set signal compensation parameters. As a result, since in the mobile radio station there is no need to provide means for calculating parameters, the size of the mobile radio station can be reduced, power consumption can be saved, and high-speed data communication can also be performed.

It is considered that the control means instructs the transmitting means to transmit a signal for requesting an assignment of a communication slot to the base station at the first data rate.

It is also considered that the control means instructs the transmitting means to transmit a predetermined training sequence for a calculation of the signal compensation parameters to the base station.

Moreover, it is considered that the transmission of the training sequence is performed in response to receiving a signal for an assignment of a communication slot received from the base station at the first data rate.

It is also considered that said second data rate is a data rate of the training sequence, and the control means instructs the transmitting means to transmit signals at the second data rate to the base station after transmitting the training sequence if necessary.

Moreover, it is considered that the first data rate is a rate at which it is not influenced by radio propagation conditions.

In addition to the mobile radio station, a base radio station for communicating with at least one mobile radio station using radio signals is also provided. The base radio station has a means for transmitting signals to the mobile radio station at a first data rate and a second data rate. The second data rate is higher than said first data rate. The base radio station also has a means for receiving signals received from the mobile radio station, an adaptive filter, connected to the receiving means, for performing signal compensation for signals received from the mobile radio station at the second data rate, an adaptive equalizing means for optimizing signal compensation parameters of the adaptive filter for a mobile radio station, and setting the optimized parameters in the adaptive filter, and control means in a first mode, for instructing the transmitting means to transmit a signal with the optimized parameters to the corresponding mobile radio station at the first data rate after the optimization of the parameters of the adaptive filter by the adaptive equalizing means, and in a second mode, controlling the transmitting and receiving means so as to transmit and receive signals at the second data rate.

It is considered that the adaptive equalizing means is activated in response to receiving a predetermined training sequence from the mobile radio station.

It is also considered that the control means assigns a communication slot to the mobile radio station and instructs the transmitting means to transmit a signal for the assignment to the mobile radio station at the first data rate.

It is also considered that the control means allows the base radio station to process signals compensated by the adaptive filter after setting the optimized parameters into the adaptive filter by the adaptive equalizing means.

Moreover, it is considered that the first data rate is a rate at which it is not influenced by radio propagation conditions, and the second data rate is a rate of the training sequence.

A person who has an ordinary skill in the art can easily combine the above-described base radio station and at least one mobile radio station as one communication system.

The above-described mobile radio station is controlled as follows:

1) receiving a signal with parameters of the adaptive filter from the base radio station at a first data rate;

2) in response to the receiving, setting the parameters in the adaptive filter; and 3) processing signals compensated by the adaptive filter and received from the base radio station at a second data rate. The second data rate is higher than said first data rate.

The above-described base radio station is controlled as follows:

1) optimizing parameters of the adaptive filter for a mobile radio station;

2) setting the optimized parameters in the adaptive filter;

3) transmitting a signal with the parameters to a corresponding mobile station at a first data rate; and 4) transmitting and receiving signals at a second data rate after transmitting the signal for the parameters.

The second data rate is higher than said first data rate.

DETAILED DESCRIPTION OF THE PREFERRED EMBODIMENT

The main point of the present invention is that the optimum tap gains (parameters) of the transversal filter (adaptive filter) are not calculated in the mobile station. However, high-speed data cannot be received unless the optimum tap gains are set to the transversal filter in the mobile station. Then, means for calculating the optimum tap gains are provided in the base station, and the calculated tap gains are to be sent to the mobile station. However, if the tap gains are sent at high speeds, it cannot be identified accurately in the mobile station which receives it. This is because the tap gains of the transversal filter have not been set. Then, the transmission of the tap gains must be performed at low speeds such that it can be identified without passing through the transversal filter in which optimum tap gains have not been set. The present invention will hereinafter be described in detail.

Figure 1:
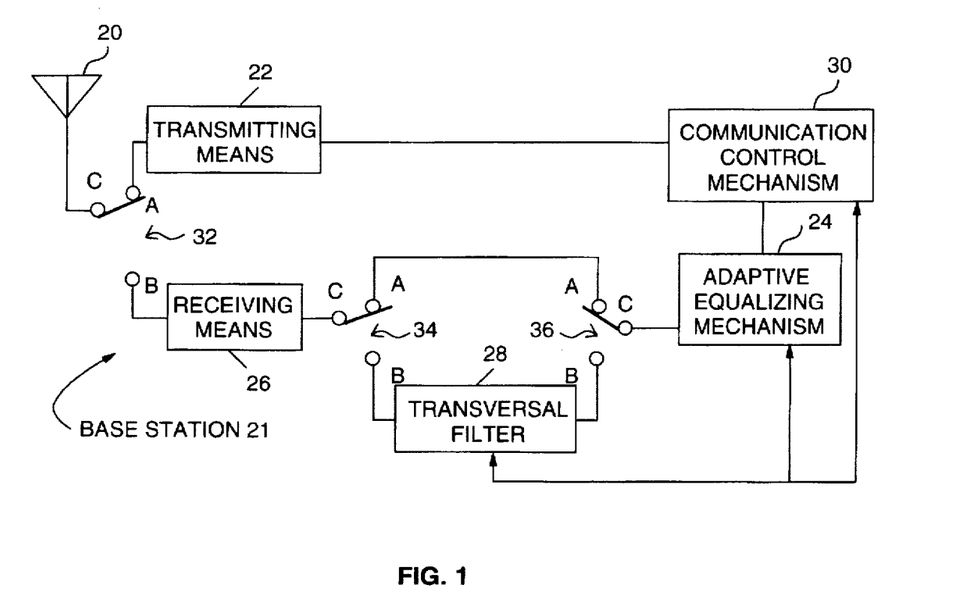
FIG. 1 is a block diagram showing a base radio station of the present invention.

The constitution of the base station is shown in FIG. 1. An antenna 20 is connected through a switch 32 to transmitting means 22 and receiving means 26. The transmitting means 22 is connected to a base-station communication control mechanism 30. The receiving means 26 is connected through a switch 34 and a switch 36 directly to an adaptive equalizing mechanism 24, or the means 26 is connected through the switch 34, a transversal filter 28 which is an adaptive filter, and the switch 36 to the adaptive equalizing mechanism (adaptive equalizing means) 24. The adaptive equalizing mechanism 24 is connected to the base-station communication control mechanism 30, which is control means. The base-station communication control mechanism 30 is connected to the adaptive equalizing mechanism 24, the transversal filter 28, and the switches 32, 34, and 36 through control lines (some of them are not shown) for controlling them.

Figure 2:
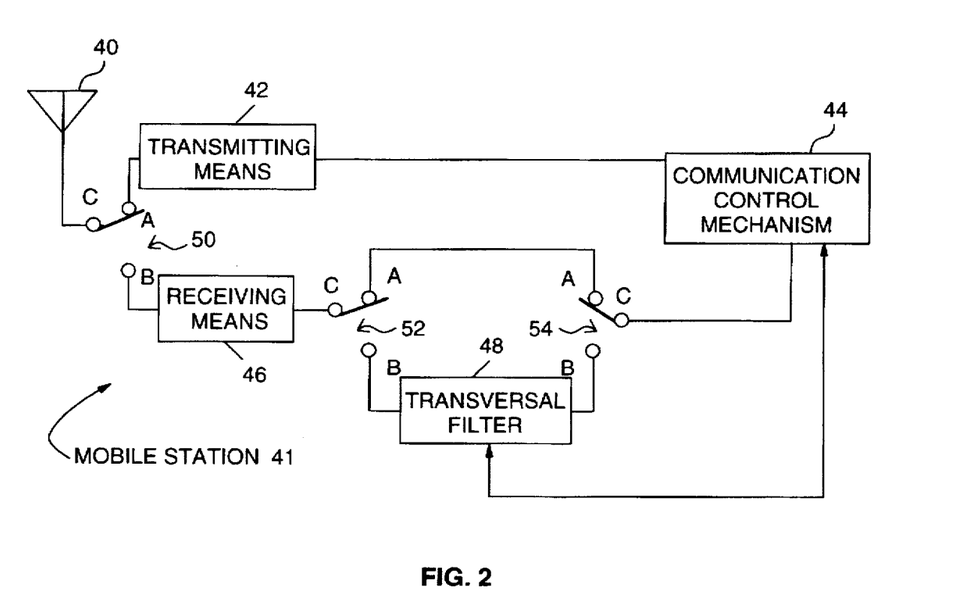
FIG. 2 is a block diagram showing a mobile radio station of the present invention.

The constitution of the mobile station is shown in FIG. 2. An antenna 40 is connected through a switch 50 to transmitting means 42 and receiving means 46. The transmitting means 42 is connected to a mobile-station communication control mechanism 44. The receiving means 46 is connected through a switch 52 and a switch 54 directly to the mobile-station communication control mechanism 44, or the means 46 is connected through the switch 52, a transversal filter 48, and the switch 54 to the mobile-station communication control mechanism 44. The mobile-station communication control mechanism 44 is connected to the transversal filter 48 which is an adaptive filter, and the switches 50, 52, and 54 through control lines (some of them are not shown) for controlling them.

Now, the operations of the above-described mobile station and base station are described. First, a case where the mobile station is about to start communication will be described using FIGS. 1, 2, and 3. In the base station BS, the base-station communication control mechanism 30 generates data for the information slot I1 of FIG. 3 and outputs it to the transmitting means 22. The transmitting means 22 modulates the information slot I1 and broadcasts it at the antenna 20. However, since a mobile station in which tap gains have not been set also receive this information slot, it is sent at a low transmission speed such that it may undergo the influence of the radio propagation conditions. This low speed means a small amount of information in a unit time. The base-station communication mechanism 30 also controls such a speed.

In the mobile station MS#1 which is about to start communication, the mobile-station communication control mechanism 44 connects the terminal c of the switch 50 to the terminal b to receive the information slot I1, and the receiving means 46 demodulates a signal received. The mobile-station communication mechanism 44, then, connects the terminals c of the switches 52 and 54 to the terminals a, respectively, and receives the information slot I1 (step 1). The content of the information slot is the same as that described in the background art. The mobile-station communication control mechanism 44 finds an empty communication slot (here, a slot #0), generates a communication slot assignment request, and outputs it to the transmitting means 42. The transmitting means 42 modulates the communication slot assignment request and outputs it at the time of the empty communication slot #0 through the antenna 40 (step 2). (Naturally the terminal c of the switch 50 has been connected to the terminal a.) This slot assignment request is also transmitted at a low transmission speed because in the base station the tap gains of the transversal filter has not been set.

Since the base-station communication control mechanism 30 knows when the time of the transmitting slot sequence TS is and when the time of the receiving slot sequence RS is, at the time the above-described information slot I1 is outputted, the mechanism 30 switches the switch 32 according to the times. In the time of the receiving slot sequence RS, the terminal c of the switch 32 is connected to the terminal b. The slot assignment request the mobile station MS#1 transmitted is then demodulated in the receiving means 26 and supplied to the base-station communication control mechanism 30. That is, for the slot #0 that the mobile station MS#1 sent, the base-station communication control mechanism 30 connects the terminals c of the switches 34 and 36 to the terminals a, and the adaptive equalizing mechanism 24 does not do any operation with respect to the communication slot assignment request. The base-station communication control mechanism 30 that received the communication slot assignment request analyzes the content of the reception to recognize that it is the communication slot assignment request from the mobile station MS#1. If the base station responds to the communication slot assignment request, it will assign the mobile station MS#1 a communication slot (here, a slot #0) and generate an information slot I2 including this assignment. And, the base station broadcasts the slot I2 from the antenna 20, as described above (step 3).

The mobile station MS#1 receives the information slot I2 in the same way as the above and analyzes the content at the mobile-station communication control mechanism 44. If the assignment of the communication slot has been done to the mobile station MS#1, the mobile-station communication control mechanism 44 will output to the transmitting means 42 the predetermined training sequence that the mobile station and the base station have shared. The outputted training sequence is modulated in the transmitting means 42 and broadcast (step 4) from the antenna 40 during the period of the slot #0 in the receiving slot sequence RS of the base station to which the communication slot was assigned. This training sequence is used in the calculation of the tap gains in the adaptive equalizing mechanism 24 of the base station, but it is not the essential part of the present invention, so it will not be described any further. However, since high-speed data communication is performed at the transmission speed after this training has been done, the training sequence has to be outputted at the same speed as this data communication.

After the communication slot assignment in the base station has been done and during the time of that slot, the base-station communication control mechanism 30 connects the terminal c of the switch 32 to the terminal b and the terminals c of the switches 34 and 36 to the terminal b. And, the base-station communication control mechanism 30 instructs the transversal filter 28 and the adaptive equalizing mechanism 24 to start processing the signal inputted through the antenna 20, the switches 32 and 34, and the receiving means 26. That is, the adaptive equalizing mechanism 24 compares the training sequence from the mobile station MS#1 which was subjected to a distortion by multipath propagation with a training sequence held in advance therein, and adjusts the tap gains so that they become optimum. If the tap gains become optimum, the operation of the adaptive equalizing mechanism 24 will be ended and the tap gains set to the transversal filter 28 will be sent to the base-station communication control mechanism 30.

The base-station communication control mechanism 30, which sends this calculated tap gains to the mobile station MS#1, generates an information slot I3 in the same way that the communication slot assignment was done with respect to the mobile station MS#1. The information slot I3 is then broadcast from the antenna 20 in the same way as the above (step 5). The information slot is sent at a low transmission speed, as described above.

Figure 6:
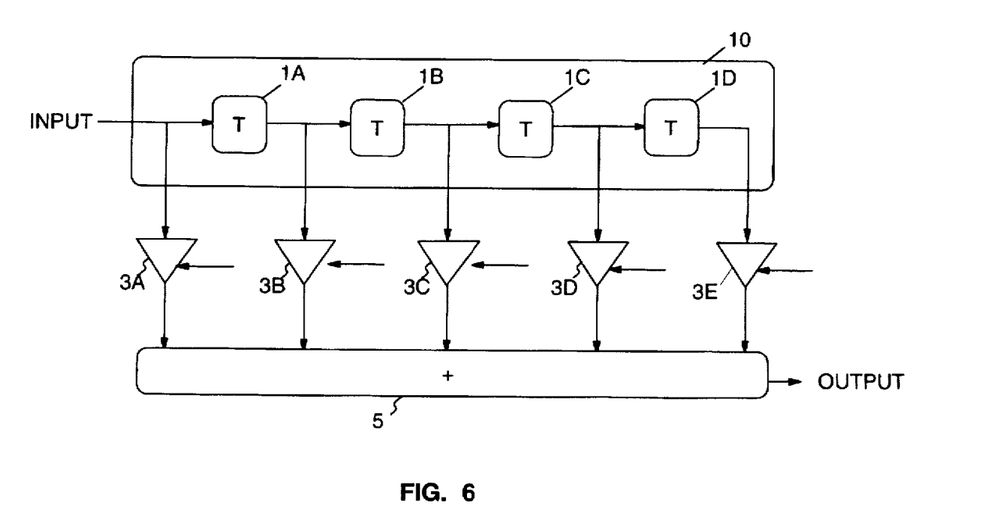
FIG. 6 is a diagram showing an example of a transversal filter.

The mobile-station communication control mechanism 44 that received the information slot I3 prepares for receiving the tap gains with the communication slot #0 of the transmitting slot sequence. The operation of the reception time is the same as the reception of the information slot. And, a signal containing the tap gains is received with the communication slot #0 of the transmitting slot sequence (step 6). The mobile-station communication control mechanism 44 which received the tap gains sets the tap gains to the variable-gain amplifier 3 (FIG. 6) of the transversal filter 48 in the mobile station.

After the tap gains have been set to the transversal filter 48, the communication between the base station and the mobile station MS#1 can be done at high speeds. That is, even if high-speed data were sent from the base station, the distortion by the multipath propagation could be removed with the transversal filter 48 on the mobile station side, and even if high-speed data were sent from the mobile station, the distortion in the transmission path could be removed with the transversal filter 28 on the base station side. Exactly speaking, in the base station the base-station communication control mechanism 30 connects the terminals c of the switches 34 and 36 to the terminal b, when data is received, so that the data can be passed through the traversal filter 28 to which the tap gains have been set. In the mobile station the mobile-station communication control mechanism 44 connects the terminals c of the switches 52 and 54 to the terminal b, when data is received, so that the data can be passed through the traversal filter 48 to which the tap gains have been set.

The foregoing is summarized to the following steps (See FIG. 4):

1. The mobile station which tries to start communication sends a communication slot assignment request to a base station at a transmission speed which is so low that a transversal filter is not needed (step 501).
2. The base station assigns this mobile station a communication slot and sends information on this communication slot assignment to the mobile station at the transmission speed which is so low that a transversal filter is not needed (step 503).
3. The mobile station sends a training sequence to the base station with the assigned communication slot at a high speed (step 505).
4. The base station calculates optimum tap gains of the transversal filter from the training sequence held therein and a signal actually received by the an adaptive equalizing mechanism (step 507).
5. The base station sends the optimum tap gains to the mobile station at the transmission speed which is so low that the transversal filter is not needed (step 509).
6. The mobile station sets to the transversal filter the tap gains sent from the base station (step 511).
7. High-speed communication is started between the base station and the mobile station (step 513).

In the case of communication with a plurality of mobile stations, each mobile station has a different propagation characteristic, so the base-station communication control mechanism 30 has to set tap gains respectively corresponding to the slots of the receiving slot sequence in the base station. The base-station communication control mechanism 30, therefore, has a part for storing the tap gains of each slot.

Figure 3:
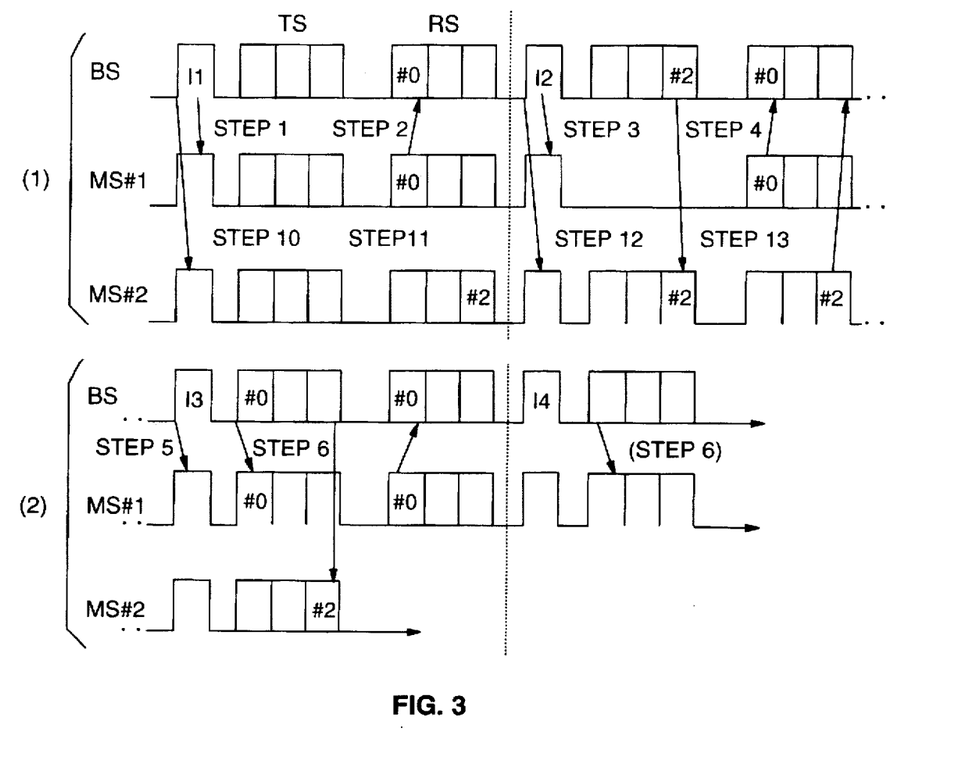
FIG. 3 is a diagram showing a flow of communication.

Next, a case where the base station tries to start communication with a mobile station MS#2 will be described making reference to FIG. 3. When the base station BS tries to start communication, it informs the mobile station MS#2 of a communication slot assignment (slot #2) with the use of the information slot II (step 10). When the mobile station MS#2 can receive this information slot II, it sends a training sequence with the assigned communication slot #2 of the receiving slot sequence in the base station at a speed at which following data is sent (step 11). The adaptive equalizing mechanism 24 of the base station calculates the optimum tap gains of the traversal filter from this training sequence.

In the information slot I2 of the next cycle the communication slot assignment does not change (step 12). And, the calculated tap gains are sent with the communication slot #2 of the transmitting slot sequence in the base station at a speed at which it is not influenced by the radio propagation conditions (step 13). The mobile station #2 receives that tap gains and sets them to the traversal filter 48. After the setting, high-speed data communication can be done.

According to the constitution described above, the mobile station can do communication with the base station at high speeds without providing an adaptive equalizing mechanism. The above-described embodiment is merely an example, so the communication slot, for example, may be separated and assigned as a receiving slot and a transmitting slot. While in FIG. 3 the number of slots of the transmitting slot sequence and the receiving slot sequence has been 3, it may be any number. In addition, as described in the description of the background of the invention, it is also possible to provide a communication slot for a communication slot assignment request.

Moreover, when the communication is performed using the same carrier frequency, the mobile station may send the training sequence without a signal for requesting a communication slot suddenly. However, as described in the background of the invention, when a plurality of carrier frequencies are used, the base station may assign the mobile station a carrier frequency different from a frequency used in sending the training sequence.

So there is a meaningless case where the mobile station sends the training sequence suddenly. Provided that it is possible that a carrier frequency for requesting an assignment (that is the training sequence) is assigned for the assignment of the communication slot. Then the mobile station can send the training sequence suddenly.

In this way, necessary resources in a mobile station can be reduced to reduce the size of the mobile station.

Further, the size of the mobile station can be reduced and power consumption saved, by eliminating an adaptive equalizing mechanism on the mobile station side.

Having thus described our invention with reference to a preferred embodiment thereof, what we desire to protect by Letters Patent is:

What is claimed is:

1. A mobile radio station for communicating with a base station using radio signals, comprising:

receiving means for receiving signals at a first data rate and at a second data rate; said second data rate being higher than said first data rate;

means for transmitting signals at the first data rate and at the second data rate;

an adaptive filter, connected to said receiving means, for performing signal compensation for signals received at said second data rate using a plurality of signal compensation parameters; and control means, in a first mode for receiving a communication slot assignment from a signal received by the receiving means at said first data rate and setting the signal compensation parameters in said adaptive filter in response to receiving a signal with said parameters at said first data rate, and in a second mode for allowing said mobile radio station to process signals received at said second data rate which are compensated by said adaptive filter in accordance with said set signal compensation parameters.

2. A mobile radio station set forth in claim 1, wherein said control means instructs said transmitting means to transmit a predetermined training sequence for a calculation of said signal compensation parameters at the second data rate.

3. A mobile radio station set forth in claim 2, wherein the transmission of said training sequence is performed in response to receiving the communication slot assignment.

4. A mobile radio station set forth in any of one claim 1, 2 or 3, wherein said first data rate is a rate at which it is not influenced by intersymbol interference.

5. A mobile radio station for communicating with a base station using radio signals, comprising:

receiving means for receiving signals at a first data rate and at a second data rate, said second data rate being higher than said first data rate;

means for transmitting signals at the first data rate and at the second data rate;

an adaptive filter, connected to said receiving means, for performing signal compensation for signals received at said second data rate, the adaptive filter using a plurality of signal compensation parameters; and, control means, in a first mode for instructing the transmitting means to transmit a signal requesting an assignment of a communication slot at said first data rate and setting the signal compensation parameters in said adaptive filter in response to receiving a signal with said parameters at said first data rate, and in a second mode for allowing said mobile radio station to process signals received from said base station at said second data rate which are compensated by said adaptive filter in accordance with said set signal compensation parameters.

6. A mobile radio station set forth in claim 5, wherein said control means instructs said transmitting means to transmit a predetermined training sequence for a calculation of said signal compensation parameters at the second data rate.

7. A mobile radio station set forth in claim 6, wherein the transmission of said training sequence is performed in response to receiving a signal assigning a communication slot at said first data rate.

8. A mobile radio station set forth in any one of claim 5, 6, or 7, wherein said first data rate is a rate at which it is not influenced by intersymbol interference.

9. A base radio station for communicating with at least one mobile radio station using radio signals, comprising:

means for transmitting signals at a first data rate and a second data rate, said second data rate being higher than said first data rate;

means for receiving signals at first data rate and the second data rate;

an adaptive filter, connected to said receiving means, for performing signal compensation for signals received at said second data rate, using a plurality of signal compensation parameters;

adaptive equalizing means for optimizing signal compensation parameters of said adaptive filter and setting the optimized parameters in said adaptive filter; and control means in a first mode, for instructing the transmitting means to transmit a signal assigning a communication slot at said first data rate and for instructing said transmitting means to transmit a signal with said optimized parameters in the assigned communication slot at said first data rate after the optimization of the parameter of said adaptive filter by said adaptive equalizing means, and in a second mode, controlling said transmitting and receiving means so as to transmit and receive signals at said second data rate.

10. A base radio station set forth in claim 9, wherein said adaptive equalizing means is activated in response to receiving a predetermined training sequence at the second data rate in the assigned communication slot.

11. A base radio station set forth in claim 9, wherein said control means allows said base radio station to process signals compensated by said adaptive filter after setting said optimized parameters into said adaptive filter by said adaptive equalizing means.

12. A base radio station for communicating with at least one mobile radio station using radio signals, comprising:

means for transmitting signals at a first data rate and a second data rate, said second data rate being higher than said first data rate;
means for receiving signals at the first data rate and the second data rate;
an adaptive filter, connected to said receiving means, for performing signal compensation for signals received at said second data rate, using a plurality of signal compensation parameters;
adaptive equalizing means for optimizing the signal compensation parameters of said adaptive filter and setting the optimized parameters in said adaptive filter; and
control means in a first mode, for assigning a communication slot and instructing said transmitting means to transmit a signal for the assignment of the communication slot at said first data rate and for instructing said transmitting means to transmit a signal with said optimized parameters in the assigned communication slot at said first data rate after the optimization of the parameters of said adaptive filter by said adaptive equalizing means, and in a second mode, controlling said transmitting and receiving means so as to transmit and receive signals at said second data rate.

13. A base radio station set forth in claim 12, wherein said adaptive equalizing means is activated in response to receiving a predetermined training sequence at the second data rate in the assigned communication slot.

14. A base radio station set forth in any one of claim 12, wherein said control means allows said base radio station to process signals compensated by said adaptive filter after setting said optimized parameters into said adaptive filter by said adaptive equalizing means.

15. A base radio station set forth in any one of claim 9, 10, 12, 11, 13, or 14, wherein said first data rate is a rate at which it is not influenced by intersymbol interference.

16. A radio communication system which includes at least one mobile radio station and a base radio station and in which between said mobile and base radio stations the transmission and reception of data are performed by a radio signal, wherein said mobile radio station comprising:

receiving means for receiving signals from said base station at a first data rate and at a second data rate; said second data rate being higher than said first data rate;
means for transmitting signals to said base station at said first data rate and said second data rate;
an adaptive filter, connected to said receiving means, for performing signal compensation for signals received from said base station at said second data rate using a plurality of signal compensation values; and
control means, in a first mode for receiving a communication slot assignment from a signal received by the receiving means at said first data rate and setting signal compensation parameters in said adaptive filter in response to receiving a signal with said parameters transmitted from said base station at said first data rate in the assigned communication slot, and in a second mode for allowing said mobile radio station to process signals received from said base station at said second data rate which are compensated by said adaptive filter in accordance with said set signal compensation parameters, and said base radio station comprising:

means for transmitting signals to said mobile radio station at said first data rate and said second data rate,
means for receiving signals received from said mobile radio station at said first data rate and said second data rate;
an adaptive filter, connected to said receiving means, for performing signal compensation for signals received from said mobile radio station at said second data rate using a plurality of signal compensation values;
adaptive equalizing means for optimizing signal compensation parameters of said adaptive filter for a mobile radio station, and setting the optimized parameters into said adaptive filter of the base station; and
control means in a first mode, for instructing the transmitting means to transmit a signal assigning a communication slot at said first data rate and for instructing said transmitting means to transmit a signal for said optimized parameters to said corresponding mobile radio station at said first data rate in the assigned communication slot after the optimization of the parameters of said adaptive filter by said adaptive equalizing means, and in a second mode, controlling said transmitting and receiving means so as to transmit and receive signals at said second data rate.

17. A radio communication system set forth in claim 16, wherein said control means in said mobile radio station instructs said transmitting means in said mobile radio station to transmit a predetermined training sequence at the second data rate, for a calculation of said signal compensation parameters to said base station, and said adaptive equalizing means is activated in response to receiving said training sequence from said mobile radio station.

18. A radio communication system set forth in claim 17, wherein said first data rate is a rate at which it is not influenced by intersymbol interference.

19. A radio communication system which includes at least one mobile radio station and a base radio station and in which between said mobile and base radio stations the transmission and reception of data are performed by a radio signal, wherein said mobile radio station comprising:

receiving means for receiving signals from said base station at a first data rate and at a second data rate: said second data rate being higher than said first data rate;
means for transmitting signals to said base station at said first data rate and said second data rate;
an adaptive filter, connected to said receiving means, for performing signal compensation for signals received from said base station at said second data rate using a plurality of signal compensation values; and
control means, in a first mode for instructing the transmitting means to transmit a signal requesting an assignment of a communication slot at said first data rate and for setting signal compensation parameters in said adaptive filter in response to receiving a signal with said parameters transmitted from said base station at said first data rate in an assigned communication slot and in a second mode for allowing said mobile radio station to process signals received from said base station at said second data rate which are compensated by said adaptive filter in accordance with said set signal compensation parameters and said base radio station comprising:

means for transmitting signals to said mobile radio station at said first data rate and said second data rate, means for receiving signals received from said mobile radio station at said first data rate and said second data rate;

an adaptive filter, connected to said receiving means, for performing signal compensation for signals received from said mobile radio station at said second data rate using a plurality of signal compensation values;

adaptive equalizing means for optimizing signal compensation parameters of said adaptive filter for a mobile radio station and setting the optimized parameters into said adaptive filter of the base station; and control means in a first mode, for instructing the transmitting means to transmit the signal assigning the communication slot at said first data rate in response to receiving the request for an assignment of a communication slot and for instructing said transmitting means to transmit the signal for said optimized parameters to said corresponding mobile radio station at said first data rate in the assigned communication slot after the optimization of the parameters of said adaptive filter by said adaptive equalizing means, and in a second mode, controlling said transmitting and receiving means so as to transmit and receive signals at said second data rate.

20. A radio communication system set forth in claim 19, wherein said control means in said mobile radio station instructs said transmitting means in said mobile radio station to transmit a predetermined training sequence at the second data rate, for a calculation of said signal compensation parameters to said base station, and said adaptive equalizing means is activated in response to receiving said training sequence from said mobile radio station.

21. A radio communication system set forth in claim 20, wherein said first data rate is a rate at which it is not influenced by intersymbol interference.

22. In a radio communication system which includes at least one mobile radio station having a first adaptive filter and a base radio station having a second adaptive filter and an adaptive equalizing means for optimizing parameters of said second adaptive filter for a mobile radio station and in which between said mobile and base radio stations the transmission and reception of data are performed by a radio signal, a method for communicating between said mobile and base radio stations, comprising steps of:

assigning said mobile radio station said communication slot by said base radio station, and transmitting a signal for the assignment from said base radio station to said mobile radio station at said first data rate;

optimizing parameters of said second adaptive filter for a mobile radio station by said adaptive equalizing means in said base radio station;

transmitting a signal with said parameters optimized by said adaptive equalizing means to said mobile radio station at a first data rate by said base radio station in the assigned communication slot;

setting said parameters in said first adaptive filter in response to receiving said signal with said parameters from said base radio station by said mobile radio station;

transmitting or receiving signals at a second data rate by said base radio station after the step of transmitting, said second data rate being higher than said first data rate; and processing signals compensated by said first adaptive filter by said mobile radio station after the step of setting.

23. A method for communicating set forth in claim 22, further comprising a step of:

transmitting a predetermined training sequence from said mobile radio station to said base radio station at said second data rate, wherein said step of optimizing is activated in response to receiving said training sequence.

24. A method for communicating set forth in claim 23, wherein said step of transmitting said training sequence is activated in response to receiving said signal for the assignment from said base radio station.

25. A method for communicating set forth in any one of claim 22, 23 or 24 wherein said first data rate is a rate at which it is not influenced by intersymbol interference.

26. In a radio communication system which includes at least one mobile radio station having a first adaptive filter and a base radio station having a second adaptive filter and an adaptive equalizing means for optimizing parameters of said second adaptive filter for a mobile radio station and in which between said mobile and base radio stations the transmission and reception of data are performed by a radio signal, a method for communicating between said mobile and base radio stations, comprising steps of:

transmitting a signal for requesting an assignment of a communication slot from said mobile radio station to said base radio station at said first data rate;

assigning said mobile radio station said communication slot by said base radio station, and transmitting a signal for the assignment from said base radio station to said mobile radio station at said first data rate;

optimizing parameters of said second adaptive filter for a mobile radio station by said adaptive equalizing means in said base radio station;

transmitting a signal with said parameters optimized by said adaptive equalizing means to said mobile radio station at a first data rate by said base radio station in the assigned communication slot;

setting said parameters in said first adaptive filter in response to receiving said signal with said parameters from said base radio station by said mobile radio station;

transmitting or receiving signals at a second data rate by said base radio station after the step of transmitting, said second data rate being higher than said first data rate; and processing signals compensated by said first adaptive filter by said mobile radio station after the step of setting.

27. A method for communicating set forth in claim 26, further comprising a step of:

transmitting a predetermined training sequence from said mobile radio station to said base radio station at said second data rate, wherein said step of optimizing is activated in response to receiving said training sequence.

28. A method for communicating set forth in claim 27, wherein said step of transmitting said training sequence is activated in response to receiving said signal for the assignment from said base radio station.

29. A method for communicating set forth in any one of claims 26, 27, or 28 wherein said first data rate is a rate at which it is not influenced by intersymbol interference.

30. In a mobile radio station communicating with a base radio station and having an adaptive filter for compensating signals from said base radio station, a method for controlling said mobile radio station, comprising steps of:
- receiving a signal with a communications slot assignment at a first data rate;
- receiving a signal with parameters of said adaptive filter at the first data rate;
- in response to said receiving, setting said parameters in said adaptive filter; and
- processing signals compensated by said adaptive filter and received at a second data rate, said second data rate being higher than said first data rate.

31. A method for controlling said mobile radio station set forth in claim 30, further comprising a step of:
- transmitting a predetermined training sequence for calculating parameters of said adaptive filter at the second data rate.

32. A method for controlling said mobile radio station set forth in claim 31, wherein said step of transmitting said training sequence is activated in response to receiving a signal for the assignment of said communication slot from said base radio station at said first data rate.

33. A method for controlling said mobile radio station set forth in one of claim 30, 31 or 32, wherein said first data rate is a rate at which it is not influenced by intersymbol interference.

34. In a mobile radio station communicating with a base radio station and having an adaptive filter for compensating signals from said base radio station, a method for controlling said mobile radio station, comprising steps of:
- transmitting a signal for requesting an assignment of a communication slot at a first data rate;
- receiving a signal with a communications slot assignment at the first data rate;
- receiving a signal with parameters of said adaptive filter at the first data rate;
- in response to said receiving setting said parameters in said adaptive filter; and
- processing signals compensated by said adaptive filter and received at a second data rate, said second data rate being higher than said first data rate.

35. A method for controlling said mobile radio station set forth in claim 34, further comprising a step of:
- transmitting a predetermined training sequence for calculating parameters of said adaptive filter at the second data rate.

36. A method for controlling said mobile radio station set forth in claim 35, wherein said step of transmitting said training sequence is activated in response to receiving a signal for the assignment of said communication slot from said base radio station at said first data rate.

37. A method for controlling said mobile radio station set forth in one of claim 34, 35 or 36, wherein said first data rate is a rate at which it is not influenced by intersymbol interference.

38. In a base radio station communicating with a mobile radio station and having an adaptive filter for compensating signals from said base radio station and adaptive equalizing means for optimizing parameters of said adaptive filter for a mobile radio station and setting the optimized parameters into said adaptive filter, a method for controlling said base radio station, comprising steps of:
- assigning a communication slot to a mobile radio station;
- transmitting the communication slot assignment to the mobile radio station at the first data rate;
- optimizing parameters of said adaptive filter for the mobile radio station;
- setting the optimized parameters in said adaptive filter;
- transmitting a signal with said parameters to the mobile station at the first data rate; and
- transmitting and receiving signals at a second data rate after transmitting said signal for said parameters, said second data rate being higher than said first data rate.

39. A method for controlling said base radio station set forth in claim 38, wherein said step of optimizing is activated in response to receiving a predetermined training sequence from said mobile radio station at the second data rate.

40. A method for controlling said base radio station set forth in claim 38 further comprising a step of:
- processing signals compensated by said adaptive filter after said step of setting.

41. A method for controlling said base radio station set forth in any one of claim 38, 39, or 40 wherein said first data rate is a rate at which it is not influenced by intersymbol interference.

42. In a base radio station communicating with a mobile radio station and having an adaptive filter for compensating signals from said base radio station and adaptive equalizing means for optimizing parameters of said adaptive filter for a mobile radio station and setting the optimized parameters into said adaptive filter, a method for controlling said base radio station, comprising steps of:
- receiving a signal containing a communications slot request from a mobile radio station at a first data rate;
- assigning a communication slot to the mobile radio station in response to the request;
- transmitting a signal for the assignment of said communication slot to said mobile radio station at said first data rate
- optimizing parameters of said adaptive filter for the mobile radio station;
- setting the optimized parameters in said adaptive filter;
- transmitting a signal with said parameters to the mobile station at the first data rate; and
- transmitting and receiving signals at a second data rate after transmitting said signal for said parameters, said second data rate being higher than said first data rate.

43. A method for controlling said base radio station set forth in claim 42, wherein said step of optimizing is activated in response to receiving a predetermined training sequence from said mobile radio station at the second data rate.

44. A method for controlling said base radio station set forth in claim 42 further comprising a step of:
- processing signals compensated by said adaptive filter after said step of setting.

45. A method for controlling said base radio station set forth in any one of claim 42, 43, 44 wherein said first data rate is a rate at which it is not influenced by intersymbol interference.

* * * * *